United States Patent [19]
Musick et al.

[11] 3,932,213
[45] Jan. 13, 1976

[54] PERMISSIVE ANALOGUE LOGIC FOR THE STEAM RELIEF VALVES OF A NUCLEAR REACTOR

[75] Inventors: Charles Ronald Musick, Vernon; Jose Marcelo Torres, Simsbury, both of Conn.

[73] Assignee: Combustion Engineering, Inc., Windsor, Conn.

[22] Filed: Apr. 2, 1973

[21] Appl. No.: 347,023

[52] U.S. Cl. .................................................. 176/60
[51] Int. Cl.[2] .......................................... G21D 3/10
[58] Field of Search .......... 176/60, 65; 60/644, 646, 60/652, 657, 660, 661, DIG. 4; 137/12, 115, 116, 118, 119, 599, 599.1, 613, 614; 89/1.5 E, 1.814

[56] References Cited

UNITED STATES PATENTS

| | | | |
|---|---|---|---|
| 3,102,394 | 9/1963 | Hartfield et al. | 60/657 |
| 3,310,683 | 3/1967 | Hottenstine | 60/652 |
| 3,358,450 | 12/1967 | Schroedter et al. | 60/646 |
| 3,629,060 | 12/1971 | Schmidt | 176/60 |
| 3,660,229 | 5/1972 | Klingbeil et al. | 176/65 |
| 3,711,457 | 1/1973 | Ayres | 137/12 |
| 3,745,877 | 7/1973 | Dobson et al. | 89/1.814 |
| 3,803,974 | 4/1974 | Everest et al. | 89/1.5 E |

*Primary Examiner*—Stephen C. Bentley
*Assistant Examiner*—C. T. Jordan
*Attorney, Agent, or Firm*—Stephen L. Borst

[57] ABSTRACT

A turbine follow system and method for pressurized water reactors with a multiplicity of load bypass valves to provide a substitute load upon a load rejection by shunting excess steam around the load to a condenser. The system provides a circuit whereby not more than one valve is opened on any one system or operator error by utilizing circuit redundancy and a permissive gate operated by one of the redundant circuits.

6 Claims, 2 Drawing Figures

BYPASS VALVE CONTROL SYSTEM
P2''
P2'
46
14
16
10
12
20
22
48''
48'
30
PRIMARY COOLANT SYSTEM 18
SECONDARY COOLING SYSTEM 24
32
42
38
28
26
40
44
34
36

PERMISSIVE ANALOGUE LOGIC FOR THE STEAM RELIEF VALVES OF A NUCLEAR REACTOR

BACKGROUND OF THE INVENTION

1. Field of the Invention

This invention pertains to a system for the actuation of a plurality of actuable devices in situations where it is desirable to prevent the actuation of more than one device upon the occurrence of any one system malfunction or operator error. More specifically, this invention applies to a control system for a nuclear power plant having a working fluid and a load with a multiplicity of parallel load bypass valves and/or atmospheric steam dump valves. In the interest of simplicity, the following discussion will be limited to describing the invention as related to load bypass valves but it should be understood that the invention is equally as applicable to atmospheric dump valves or any plurality of actuable devices. In the operation of a nuclear power plant in which a working fluid is supplied to a load or turbine, the situation occasionally arises where the load or turbine requires a decreased output thereby requiring a decreased supply of energy delivered to it by the working fluid. In such a situation, the excess energy stored in the working fluid that can no longer be utilized by the turbine must be dissipated in order to avoid undesirable consequences such as an energy backup which directly affects the safety of the power plant. One means of dissipating the excess energy is to provide a load bypass system comprising either one large bypass valve or a plurality of smaller bypass valves and/or an atmospheric steam dump valve system. These bypass valve systems provide a substitute load by shunting the working fluid around the load to an energy sink, usually the condenser following the turbine. An essential prerequisite of such a load bypass system is that the bypass valve or valves be prevented from opening erroneously. Utilization of a plurality of bypass valves has the advantage that each of the less-than-full-capacity bypass valves which make up the bypass system can be isolated from the others so that an error or system malfunction can cause the opening of only one valve constituting a small percentage of the total valve capacity. The present invention provides an analogue logic circuit which assures that not more than one valve is open on any one system or operator error.

SUMMARY OF THE INVENTION

The present invention consists of a circuit which allows the control of a plurality of load bypass valves without creating the possibility that more than one valve can be opened erroneously. This is accomplished by the provision of a main signal channel and a redundant signal or "permissive" channel. The main signal channel generates a signal from the appropriate power plant system's parameters for the actuation of a plurality of load bypass valves. The redundant or second channel also generates a signal indicative of a need for the actuation of the load bypass valves. The signal from the second channel is delivered to a series of permissive gates intermediate the signal generation means of the first channel and the valves. These permissive gates allow the valve actuation signal generated by the first channel to pass to the valves only when the signal from the second channel indicates that a bona fide valve demand exists. The signal from the second channel is biased to always be present when the signal in the first channel is, so that under normal operation, whenever a valid signal from the first channel exists, the permissive gates will see a valve demand signal from the second channel. In this way, the second channel is not allowed to interfere with the operation of the valves on the signal from the first channel unless a malfunction occurs.

DESCRIPTION OF THE PREFERRED EMBODIMENT

Figure 1:
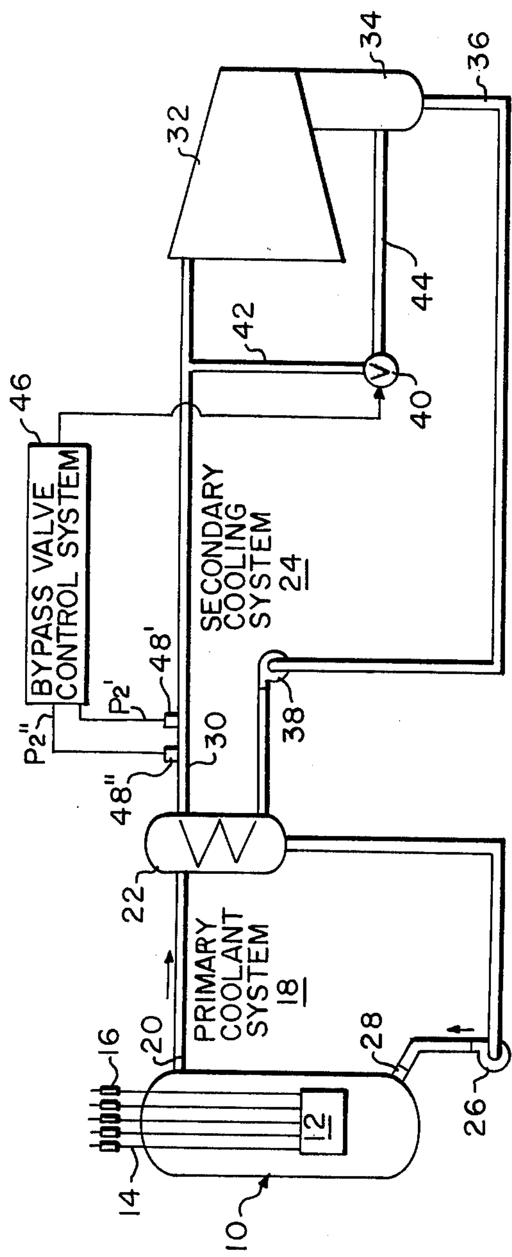
FIG. 1 is a schematic diagram of a nuclear power generating system showing the secondary coolant circuit bypass valve and its control system.

The nuclear power system relevant to the instant invention can be seen in FIG. 1. The power reactor 10 has core 12 which is controlled by control rods 14 which penetrate the reactor shell 10. The control rods 14 are actuated by driving means 16. The reactor 10 and core 12 are cooled by the primary coolant system (generally indicated by 18) which provides a continuous flow of primary coolant to and from the reactor 10. The coolant exits the reactor 10 at exit nozzle 20 and is circulated to a heat exchanger 22 where it gives up some of its heat to the secondary coolant system (generally indicated by 24). After passing through the heat exchanger 22, the primary coolant is returned to the reactor 10 through pump 26 and inlet nozzle 28.

The heated secondary coolant, which is usually water, is caused to pass in its vapor form through pressure pipe 30 to the load or turbine 32. After passing through the turbine 32, the vapor or steam is quenched in condenser 34 and eventually returned through pressure pipe 36 via feed water pump 38 to the heat exchanger 22. Turbine or load bypass valves 40 are provided to allow the shunting of the coolant vapor or steam through pipe 42 and 44, past the turbine 32 and to the condenser 34.

Figure 2:
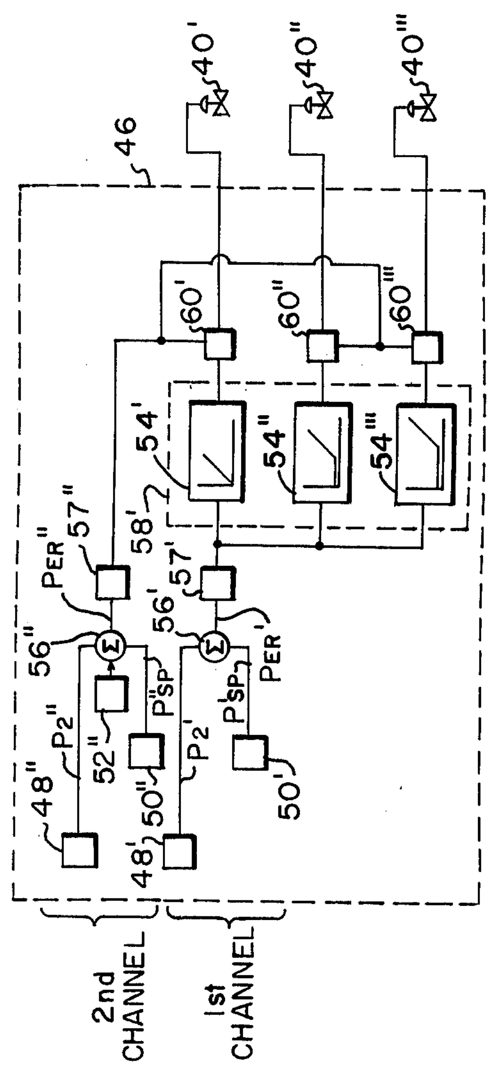
FIG. 2 is a detailed circuit of the bypass valve control system.

The load bypass valve control system is generally indicated by 46. In the following discussion, the first signal generating channel (see FIG. 2) will be described using numbers with primes and the second channel will be described using numbers with double primes. The first channel measures the pressure of the working fluid (indicated as $P_2'$) by pressure sensor 48'. Setpoint generator 50' provides a pressure setpoint (indicated as Psp'). Comparator 56' compares the actual pressure $P_2'$ as measuring to the setpoint pressure Psp' and generates a pressure error signal ($P_{er}'$). This pressure error signal ($P_{er}'$) is delivered to a controller 57' and then to a programmable signal generator 58' which generates a multiplicity of valve actuating signals which are commensurate with the signal from controller 57'. As used herein, the term "commensurate with" designates a functional relationship between the signals or parameters of interest and is not limited to meaning a proportional relationship described by a fixed ratio. The programmable signal generator may be comprised of individual programmers 54', 54'', and 54'''. It should be understood that this description and diagram show only 3 bypass valves rather than a greater multiplicity since the circuitry is merely redundant and can be expanded to include as many valves and programmers 54 as one wishes. Programmers 54 can be preprogrammed to generate individual signals each independently commensurate with the input signal which are sequenced so that the individual valves 40 are opened in a predetermined order and in a predetermined manner (as shown diagramatically in FIG. 1).

The second channel consists of a pressure sensor 48″ which detects the pressure of the secondary system 24 or working fluid pressure as indicated by $P_2''$. In a manner similar to that described in channel 1, channel 2 detects the working fluid's pressure ($P_2''$) by a pressure sensor 48″ and compares the pressure signal $P_2''$ to a pressure setpoint signal $P_{sp}''$ generated by setpoint generator 50″ in comparator 56″ to generate a pressure error signal $P_{er}''$. Comparator 56″ also adds in a small bias from biasing means 52″ so that the pressure error signal $P_{er}''$ of channel two is slightly greater than the pressure error signal $P_{er}'$ of channel one. This pressure error signal $P_{er}''$ is passed to a controller 57″ which performs the same function as controller 57′ in channel one. The signal from controller 57″ of channel 2 is delivered to permissive gates 60′, 60″ and 60‴ which are situated intermediate programmer 58′ and the individual valves 40′, 40″ and 40‴. The permissive gates 60 are normally in a signal blocking mode so that no actuation signal emitted from 58′ is passed to the respective bypass valves. The permissive gates are responsive to the biased signal from controller 57″ in channel 2 so that when channel 2 generates a signal indicative of a valve demand, permissive gates 60′, 60″ and 60‴ allow the passage of the actuating signals from channel 1 to the individual valves 40.

With the redundant and signal blocking arrangement, no single operator error or load bypass valve control system failure will open more than one bypass valve. The bypass valves can only be operated by a signal from channel 1 when there is also a signal from channel 2 indicative of a bypass valve opening demand. With the present system, a single failure can cause the erroneous opening of a bypass valve only in the event that the failure occurs between the permissive gate and the valve. In such a case only one of the plurality of valves would be opened erroneously. Any failure that occurs on the other side of the permissive gate can not cause the opening of any valve since two signals indicating a valve demand are required for the actuating signal to be passed beyond the permissive gate 60. A failure in channel 2, the permissive channel, would only lead to a blocking of all actuating signals to the valve so that an erroneous opening of a bypass valve would never occur.

It will be understood that the embodiment shown and described herein is merely illustrative and that changes may be made without departing from the scope of the invention as claimed.

What is claimed is:

1. A system for the actuation of a plurality of actuable devices whereby the system prevents the actuation of more than one device upon the occurrence of any malfunction including operator error and apparatus failure, the system comprising:

a. first means for generating a first actuation signal;

b. second means parallel to said first means for generating a second actuation signal;

c. means responsive to said first signal for generating a multiplicity of signals for individually actuating said plurality of devices; and d. a plurality of gate means intermediate said means for generating said first multiplicity of actuation signals and said multiplicity of actuable devices, and responsive to said second signal for selectively passing each individual signal to each device.

2. A control system for a power plant having a working fluid and a multiplicity of parallel steam relief valves whereby the system prevents the actuation of more than one valve on the occurrence of any malfunction including operator error and apparatus failure, the system comprising:

a. first means responsive to said working fluid for generating a first signal for the actuation of said valves;

b. second means responsive to said working fluid for generating a second signal for the actuation of said valves;

c. means responsive to said first signal for generating a multiplicity of signals for individually actuating said multiplicity of valves, each of said multiplicity of signals individually commensurate with said first signal; and d. a multiplicity of permissive gate means intermediate said means for generating a multiplicity of signals and said multiplicity of valves, said gate means responsive to said second valve actuation signal for selectively passing each individual signal of said means for generating a multiplicity of signals to each individual valve.

3. A control system as recited in claim 2 wherein said first means for generating a first signal for the actuation of said valves includes:

a. means for generating a signal commensurate with the pressure of said working fluid;

b. means for providing a signal commensurate with a pressure setpoint; and c. means responsive to said signal commensurate with the pressure of said working fluid for comparing said signal commensurate with the pressure of said working fluid to said pressure setpoint signal to generate a pressure error signal, said pressure error signal constituting said first signal for the actuation of said steam relief valves.

4. A control system as recited in claim 2 wherein said first means for generating a first signal for the actuation of said valves includes:

a. means for generating a signal commensurate with the pressure of said working fluid;

b. means for providing a signal commensurate with a pressure setpoint;

c. means responsive to said signal commensurate with the pressure of said working fluid for comparing said signal commensurate with the pressure of said working fluid to said pressure setpoint signal to generate a pressure error signal; and d. controller means responsive to said pressure error signal for generating a signal for actuating said steam relief valves in accordance with said pressure error signal.

5. A control system as recited in claim 2 wherein both first and second means for generating signals for the actuation of said valves each includes:

a. means for generating a signal commensurate with the pressure of said working fluid;

b. means for providing a signal commensurate with a pressure setpoint; and c. means responsive to said signal commensurate with the pressure of said working fluid for comparing said signal commensurate with the pressure of said working fluid to said pressure setpoint signal to generate a pressure error signal.

6. The apparatus of claim 2 wherein said second valve actuation signal is biased to be greater than said first valve actuation signal so that said permissive gate means receives a greater signal than said means for generating a multiplicity of valve actuating signals.

* * * * *